United States Patent
Zur et al.

(10) Patent No.: US 9,480,025 B2
(45) Date of Patent: Oct. 25, 2016

(54) ADAPTIVE DEVICE TRANSMISSION POWER FOR INTERFERENCE REDUCTION

(71) Applicants: Liraz Zur, Beaverton, OR (US); Noam Ginsburg, Haifa (IL); Izoslav Tchigevsky, Portland, OR (US)

(72) Inventors: Liraz Zur, Beaverton, OR (US); Noam Ginsburg, Haifa (IL); Izoslav Tchigevsky, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/670,853

(22) Filed: Mar. 27, 2015

(65) Prior Publication Data

US 2016/0286500 A1 Sep. 29, 2016

(51) Int. Cl.
*H04W 52/24* (2009.01)
*H04L 29/08* (2006.01)

(52) U.S. Cl.
CPC ............ *H04W 52/24* (2013.01); *H04L 67/104* (2013.01)

(58) Field of Classification Search
CPC ... H04B 1/525; H04B 1/1027; H04W 16/14; H04W 28/04; H04W 52/24; H04L 67/104
USPC ............................................. 455/63.1–67.13
See application file for complete search history.

(56) References Cited

U.S. PATENT DOCUMENTS

| | | | |
|---|---|---|---|
| 2006/0094370 A1 | 5/2006 | Nguyen | |
| 2006/0252418 A1* | 11/2006 | Quinn | ......... H04W 16/10 455/423 |
| 2007/0060057 A1 | 3/2007 | Matsuo | |
| 2011/0090885 A1 | 4/2011 | Safavi | |
| 2013/0017794 A1 | 1/2013 | Kloper et al. | |

FOREIGN PATENT DOCUMENTS

| | | |
|---|---|---|
| KR | 1020070060597 | 6/2007 |
| KR | 1020100083040 | 7/2010 |
| KR | 1020130042104 | 4/2013 |
| WO | 03061204 | 7/2003 |
| WO | 2011140302 | 11/2011 |
| WO | 2013185279 | 12/2013 |

OTHER PUBLICATIONS

International Search Report and Written Opinion from PCT Application No. PCT/US2016/017570 mailed May 31, 2016. (10 pgs.).
International Search Report and Written Opinion from PCT Application No. PCT/US2016/020239 mailed Jun. 29, 2016. (11 pgs.).

* cited by examiner

*Primary Examiner* — Raymond Dean
(74) *Attorney, Agent, or Firm* — Sutherland Asbill & Brennan LLP

(57) ABSTRACT

This disclosure describes systems, methods, and computer-readable media related to adaptive device transmission power to reduce interference. In some embodiments, a device may establish a peer-to-peer connection with a second user device. The device may receive information from an access point and may generate or determine additional information. Using the received, generated, and/or determined information, the device may determine to reduce its transmission power and may facilitate the reduction of transmission power for associated devices.

21 Claims, 5 Drawing Sheets

ADAPTIVE DEVICE TRANSMISSION POWER FOR INTERFERENCE REDUCTION

TECHNICAL FIELD

This disclosure generally relates to systems and methods for adaptive device transmission power for interference reduction.

BACKGROUND

User devices, such as smartphones, tablets, and wearable technology, have become more powerful and mobile. User devices may establish connections with other devices without requiring a wireless access point. Such connections may be used for browsing the Internet, transferring data, and communicating with other devices. However, as there are an increasing number of users, networks may become crowded and slow. Typically, wireless networking may occur in the 2.4 GHz frequency band. However, some devices may opt to utilize channels in the 5 GHz band due to its relative lack of traffic. Unfortunately, the 5 GHz bands may be regulated by government regulations, such as for air traffic control and weather radars.

To make the 5 GHz band available for wireless networking in a safe manner, various agencies have laid out specifications for how a wireless device selects an operating channel. This scheme, called "dynamic frequency selection" (DFS), requires that a "master" station listen to a channel for a minimum period of time to ensure that no radars are operating there before transmitting. Thereafter, the station must continue to listen for radars; should one happen to move into the neighborhood, the station must shut down all communications and move to a different channel. In essence, wireless devices operating in the 5 GHz band must actively avoid transmitting on channels where radars are operating.

Unfortunately, many devices have limited power capabilities and may not be equipped to detect radar operators, thus limiting their ability to utilize the 5 GHz band.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
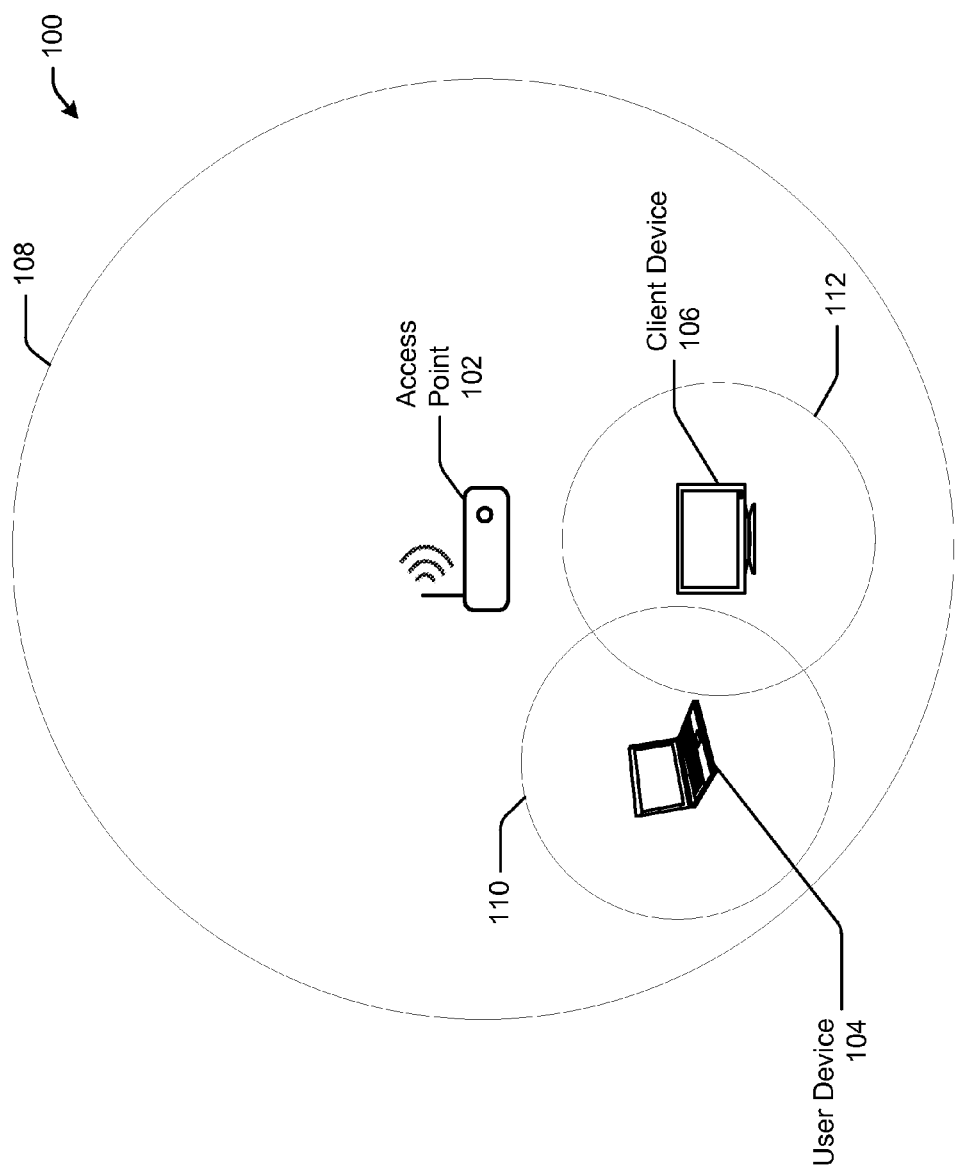
FIG. 1 depicts an illustrative diagram depicting an example embodiment of an adaptive device transmission power for interference reduction in accordance with one or more embodiments of the disclosure.

A feature of user devices may be the ability to establish wireless personal area networks (PAN), which allow user devices to communicate wirelessly with other devices. However, certain frequency bands used for wireless communication may be regulated and thus are not readily available for utilization by user devices. For example, many wireless networks operate within a 2.4 GHz frequency band, which with the increase of users, may bet crowded and noisy. Thus, some user devices may be capable of operating on a different frequency band, such as 5 GHz. However, such frequency bands may be used for regulated operations, such as radar for aviation radars or weather radars. To avoid such collisions, dynamic frequency selection (DFS) may be utilized to select channels within the frequency band that are not actively being used for regulated activities. DFS may require that a master station monitor a channel for a minimum period of time to ensure that no regulated activity (e.g., radars) are operating prior to transmitting data. The station must continuously monitor for the regulated activity and if any regulated activity is detected, the switch to a different channel to avoid transmitting on the same channels as the regulated activity. However, user devices may not have the capability to monitor for regulated activity, which limits their ability to utilize the less crowded channels on the frequency band.

This disclosure relates to, among other things, systems, methods, computer-readable media, techniques and methodology for adaptive device transmission power for interference reduction. The user devices may rely on the detection capabilities of the master stations (e.g., access points) for detection of regulated activities. User devices (and client devices associated with the user devices via peer-to-peer connections) thus adaptively adjust their transmission power to adjust the circle of coverage generated by the user device to be within a circle of coverage generated by the access point. Thus, if there is activity occurring in the circle of coverage of the access point, the user device may receive an indication that there is regulated activity and can change to a different channel within the frequency band, along with the access point, to avoid the regulated activity. Accordingly, the user device would have the benefit of utilizing the frequency band even without the capability of detecting the regulated activity since it is relying on the capabilities of the access point.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

FIG. 1 depicts an illustrative diagram 100 depicting an example embodiment of an adaptive device transmission power for interference reduction in accordance with one or more embodiments of the disclosure. In some embodiments, an access point 102 may generate a circle of coverage 108. Similarly, a user device 104 may generate a circle of coverage 110 and a client device 106 may generate a circle of coverage 112. The circle of coverage 108 generated by the access point 102 may be indicative of the area the access point 102 is capable of transmit data. In some embodiments, the access point 102 may be a stationary base station with a constant power source. Access points 102 may operate within a single channel. In some embodiments, the access point 102 may include specialized hardware to detect active radar. If active radar is detected, the access point 102 may need to terminate all active communications and switch to a different channel within a frequency band to avoid transmitting on channels where radars are operating.

In some embodiments, a user device 104 may establish a peer-to-peer connection with a client device 106, such as through WiFi direct. The user device 104 may generate a circle of coverage 110 and the client device 106 may generate a circle over coverage 112. In some embodiments, the user device 104 and client device 106 are battery operated devices that may not have radar detection capabilities, but may wish to utilize a channel where radars may operate. In some embodiments, the user device 104 could be within the circle of coverage 108 of the access point 102 while the client device 106 could reside outside of the circle of coverage 108 of the access point. If the user device 104 and client device 106 are positioned such that the client device 106 is outside the circle of coverage 108 of the access point 102, the peer-to-peer connection between the user device 104 and the client device 106 may cause unlawful interference of radar operations within the channel. However, if the user device 104 is able to determine circle of coverage 108 of the access point 102 and adaptively adjust the transmission power of the user device 104 and the client device 106 to ensure both devices are within the circle of coverage 108, the user device 108 may rely on the radar detection of the access point 102 to determine if there is a need to stop communications and either switch to another channel on the frequency band or terminate all communications with the client device 106, thus reducing interference of radar activities within the channel of the frequency band.

Figure 2:
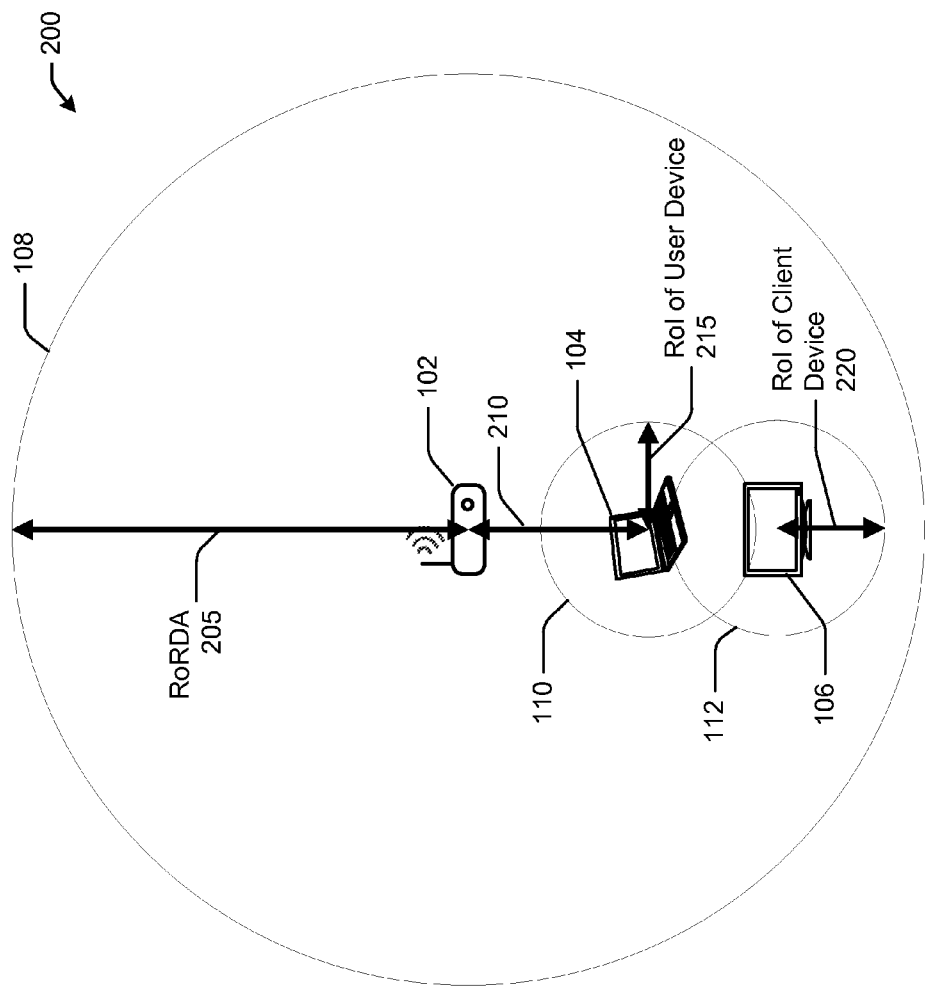
FIG. 2 is an illustrative diagram of the different measurements used to adjust the transmission power of user device(s) and client device(s) in accordance with one or more embodiments of the disclosure.

FIG. 2 is an illustrative diagram 200 of the different measurements used to adjust the transmission power of user device 104 and client device 106 in accordance with one or more embodiments of the disclosure. The circle of coverage 108 may represent the coverage area that is monitored by the access point to ensure that radar activity is present prior to transmitting data. If radar activity is detected, the access point 102 may terminate all active communications and move to a different channel, thus actively avoiding transmitting on channels where radars are operating. The circle of coverage 108 may be generated by the access point 102 may be associated with a value, such as the radius of radar detection area (RoRDA) value 205. The RoRDA value 205 may represent a radius of the circle of coverage 108. The distance 210 between the access point 102 and the user device 104 may be measured by the user device 104 using different techniques, such as time of flight calculations and/or RSSI of messages or frames transmitted by the access point 102 and received by the user device 104.

The radius of interference (RoI) 215 of the user device 104 may be calculated by the user device 104 using the current transmission power of the user device 104. RoI 214 of the user device 104 may be indicative of the distance between the user device 104 and the edge or outer limit of the circle of coverage 110 of the user device 104. Similarly, the radius of interference (RoI) 220 of the client device 105 may be indicative of the distance between the client device 106 and the edge or outer limit of the circle of coverage 112 of the client device 106.

Figure 3:
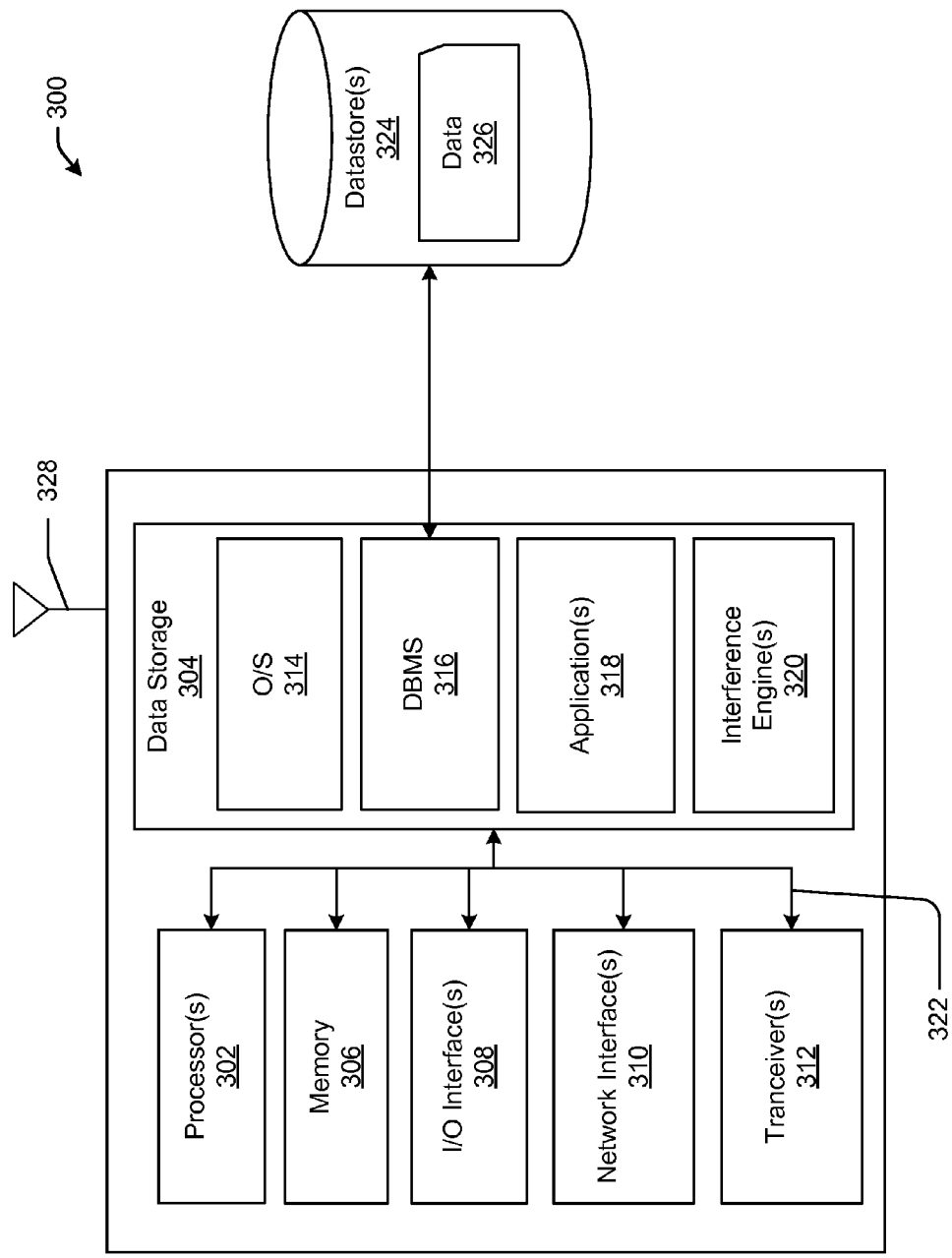
FIG. 3 is a block diagram including various hardware and software components of the illustrative system architecture depicted in FIG. 1 in accordance with one or more embodiments of the disclosure.

FIG. 3 is a schematic block diagram of an illustrative user device 300 that may be used to perform any of the data processing and user device configuration described herein in accordance with one or more example embodiments of the disclosure. In an illustrative configuration, the user device 300 may include one or more processors (processor(s)) 302, one or more memory devices 306 (generically referred to herein as memory 306), one or more input/output ("I/O") interface(s) 308, one or more network interface(s) 310, one or more transceiver(s) 312, and data storage 304. The user device 300 may further include one or more buses 322 that functionally couple various components of the user device 300. In certain example embodiments, the user device 300 may be a mobile device that may include one or more antennas 328.

The antenna 328 may include any suitable type of antenna depending, for example, on the communications protocols used to transmit or receive signals via the antennas 328. Non-limiting examples of suitable antennas may include directional antennas, non-directional antennas, dipole antennas, folded dipole antennas, patch antennas, multiple-input multiple-output (MIMO) antennas, or the like. The antenna 328 may be communicatively coupled to one or more transceivers 312 or radio components to which or from which signals may be transmitted or received.

In some embodiments, the antenna 328 may be a cellular antenna which may be configured to transmit or receive signals in accordance with established standards and protocols, such as GSM, 3G standards (e.g., Universal Mobile Telecommunications System (UMTS), Wideband Code Division Multiple Access (W-CDMA), CDMA2000, etc.), 4G standards (e.g., LTE, WiMax, etc.), direct satellite communications, or the like.

In some embodiments, the antenna 328 may be a Wi-Fi antenna which may be configured to transmit or receive signals in accordance with established standards and protocols, such as IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna 306 may be configured to transmit or receive radio frequency signals within the unlicensed portion of the radio spectrum.

In some embodiments, the antenna 328 may be a Global Navigation Satellite System (GNSS) antenna which may be configured to receive GNSS signals from three or more GNSS satellites carrying time-position information to triangulate a position therefrom. The GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver 312 may include any suitable radio component(s) for, in cooperation with the antenna 328, transmitting or receiving radio frequency (RF) signals in the bandwidth and/or channels corresponding to the communications protocols utilized by the user device 300 to communicate with other devices. The transceiver 312 may include hardware, software, and/or firmware for modulating, transmitting, or receiving—potentially in cooperation with any of antenna 328—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver 312 may further include hardware, firmware, or software for receiving GNSS signals via, for example, the antenna 308. The transceiver 12 may include any known receiver and baseband suitable for communicating via the communications protocols utilized by the user device 300. The transceiver 312 may further include a low noise amplifier (LNA), additional signal amplifiers, an analog-to-digital (A/D) converter, one or more buffers, digital baseband, or the like.

The bus(es) 322 may include at least one of a system bus, a memory bus, an address bus, or a message bus, and may permit exchange of information (e.g., data (including computer-executable code), signaling, etc.) between various components of the user device 300. The bus(es) 322 may include, without limitation, a memory bus or a memory controller, a peripheral bus, an accelerated graphics port, and so forth. The bus(es) 322 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 306 of the user device 300 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 306 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 306 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 304 may include removable storage and/or non-removable storage including, but not limited to, magnetic storage, optical disk storage, solid-state storage, and/or tape storage. The data storage 304 may provide non-volatile storage of computer-executable instructions and other data. The memory 306 and the data storage 304, removable and/or non-removable, are examples of computer-readable storage media (CRSM) as that term is used herein.

The data storage 304 may store computer-executable code, instructions, or the like that may be loadable into the memory 306 and executable by the processor(s) 302 to cause the processor(s) 302 to perform or initiate various operations. The data storage 304 may additionally store data that may be copied to memory 306 for use by the processor(s) 302 during the execution of the computer-executable instructions. Moreover, output data generated as a result of execution of the computer-executable instructions by the processor(s) 302 may be stored initially in memory 306, and may ultimately be copied to data storage 304 for non-volatile storage.

More specifically, the data storage 304 may store one or more operating systems (O/S) 314; one or more database management systems (DBMS) 316; and one or more program modules, applications, or the like such as, for example, one or more application(s) 318 and/or one or more interference engine(s) 320. The data storage 304 may further store any of variety of other types of modules. Further, any program modules stored in the data storage 304 may include one or more sub-modules. Further, any data stored in the data storage 304 may be loaded into the memory 306 for use by the processor(s) 302 in executing computer-executable code. In addition, any data potentially stored in one or more datastores 324 (e.g., data 326) may be accessed via the DBMS 316 and loaded in the memory 306 for use by the processor(s) 302 in executing computer-executable code.

The processor(s) 302 may be configured to access the memory 306 and execute computer-executable instructions loaded therein. For example, the processor(s) 302 may be configured to execute computer-executable instructions of the various program modules of the user device 300 to cause or facilitate various operations to be performed in accordance with one or more embodiments of the disclosure. The processor(s) 302 may include any suitable processing unit capable of accepting data as input, processing the input data in accordance with stored computer-executable instructions, and generating output data. The processor(s) 302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 302 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 302 may be capable of supporting any of a variety of instruction sets.

Referring now to functionality supported by the various program modules depicted in FIG. 3, the application(s) 318 may include computer-executable instructions, code, or the like that, responsive to execution by one or more of the processor(s) 302, may obtain data, process and/or generate data, and present data to a user of the user device 300. In some embodiments, the application(s) 318 may obtain and/or receive data 326 from a datastore 324, remote server, or other user device 300.

The interference engine(s) 320 may include computer-executable instructions, code, or the like that, responsive to execution by one or more of the processor(s) 302, may communicate with an access point 102 and one or more user devices 104. The interference engine 320 may receive information from an access point 102 and/or the other user devices 104. The interference engine 320 may use the received information to calculate additional information. The interference engine 320 may use the received and/or calculated information to determine whether to adjust the transmission power of the user device 300 or that of other user devices 104, which is discussed in further detail in association with FIGS. 4-5 below.

Referring now to other illustrative components depicted as being stored in the data storage 304, the O/S 314 may be loaded from the data storage 304 into the memory 306 and may provide an interface between other application software executing on the device 300 and hardware resources of the device 300. More specifically, the O/S 314 may include a set of computer-executable instructions for managing hardware resources of the device 300 and for providing common services to other application programs (e.g., managing memory allocation among various application programs). The O/S 314 may include any operating system now known or which may be developed in the future including, but not limited to, any server operating system, any mainframe operating system, or any other proprietary or non-proprietary operating system.

The DBMS 316 may be loaded into the memory 306 and may support functionality for accessing, retrieving, storing, and/or manipulating data stored in the memory 306, data stored in the data storage 304, and/or data stored in the one or more datastores 324. The DBMS 316 may use any of a variety of database models (e.g., relational model, object model, etc.) and may support any of a variety of query languages. The DBMS 316 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the user device 300 is a mobile device, the DBMS 316 may be any suitable light-weight DBMS optimized for performance on a mobile device. Referring to the example types of data depicted as being stored in the datastore(s) 324, the data 326 may include kind of data that may be accessed by a user device 300, such as movies, music, application data generated by one or more application(s) 318 and associated with a user of the user device 300, etc. It should be appreciated that "data," as that term is used herein, includes computer-executable instructions, code, or the like.

Referring now to other illustrative components of the device 300, the one or more input/output (I/O) interfaces 308 may facilitate the receipt of input information by the device 300 from one or more I/O devices as well as the output of information from the device 300 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 300 or may be separate. The I/O devices may further include, for example, any number of peripheral devices such as data storage devices, printing devices, and so forth.

The I/O interface(s) 308 may also include an interface for an external peripheral device connection such as universal serial bus (USB), FireWire, Thunderbolt, Ethernet port or other connection protocol that may connect to one or more networks. The I/O interface(s) 308 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The user device 300 may further include one or more network interfaces 310 via which the user device 300 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Those of ordinary skill in the art will appreciate that any of the components of the architecture 300 may include alternate and/or additional hardware, software or firmware components beyond those described or depicted without departing from the scope of the disclosure. More particularly, it should be appreciated that software, firmware or hardware components depicted or described as forming part of any of the illustrative components of the architecture 300, and the associated functionality that such components support, are merely illustrative and that some components may not be present or additional components may be provided in various embodiments. While various program modules have been depicted and described with respect to various illustrative components of the architecture 300, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative networked architecture 300 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 300, or additional functionality.

Illustrative Data and Process Flows

Figure 4:
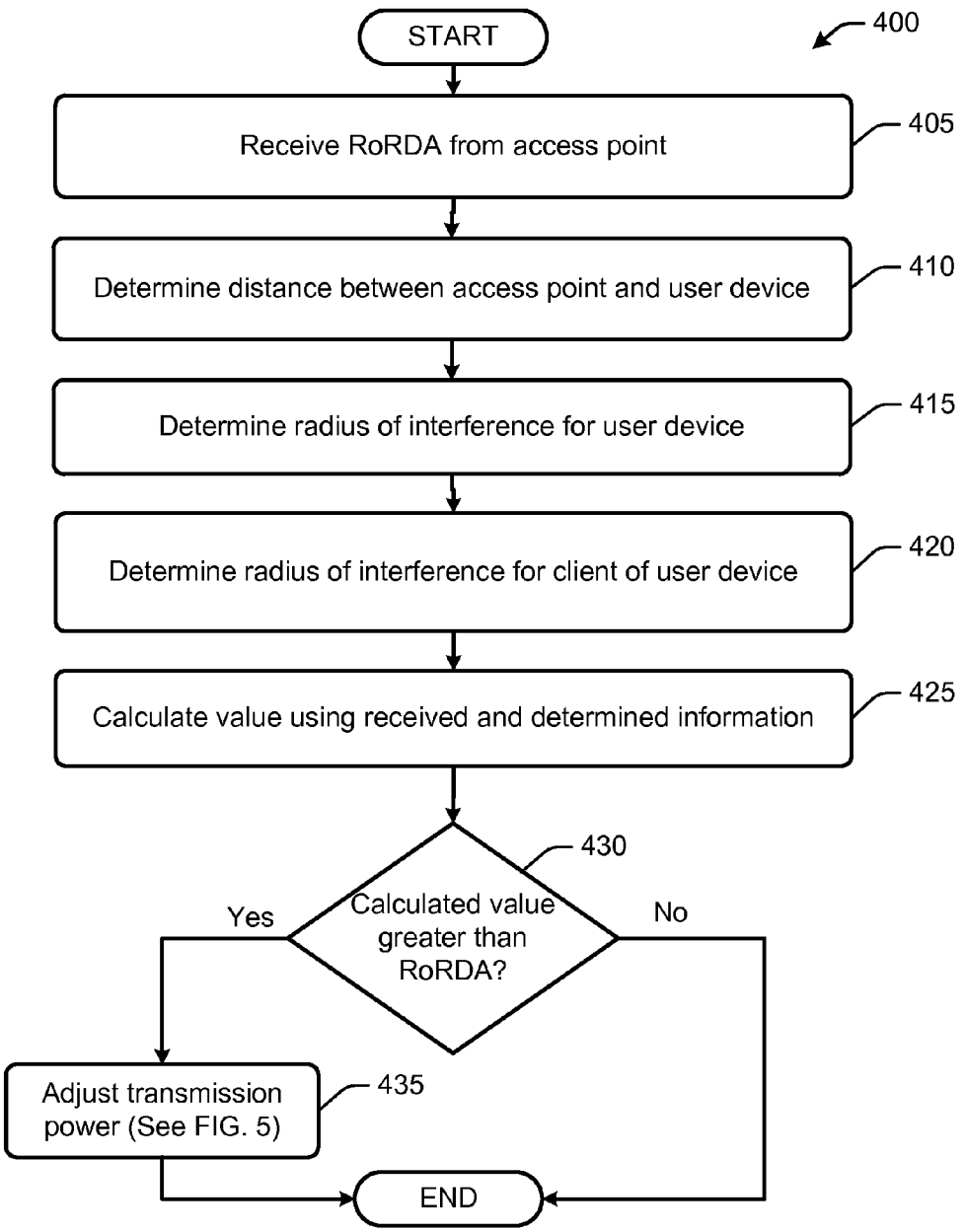
FIG. 4 is a process flow diagram of an illustrative method for adaptive device transmission power for interference reduction in accordance with one or more embodiments of the disclosure.

FIG. 4 is a process flow diagram of an illustrative method 400 for adaptive device transmission power for interference reduction in accordance with one or more embodiments of the disclosure. At block 405, the interference engine 320 of the user device 104 may receive a RoRDA value 205 from an access point 102. In some embodiments, the access point 102 may calculate the RoRDA value 205 using a separate hardware chip. In some embodiments, the access point 102 may determine the RoRDA value 205 based on the strength of the transmission power associated with the access point 102. The access point 205 may generate a frame, such as an action frame or a beacon frame and may transmit or publish the frame. The user device 104 may receive the frame and identify or obtain the RoRDA value from the frame.

At block 410, the interference engine 320 may determine the distance 210 between the access point 102 and the user device 104. In some embodiments, the interference engine 320 may calculate the distance between the access point 102 and the user device 104 using RSSI of frames sent by the access point 102 and received by the user device 104. In some embodiments, the interference engine 320 may use time of flight calculations (e.g., transmitting frames or other data from the user device 104 to the access point 102 and measuring the time it takes to receive a response from the access point 102)

At block 415, the interference engine 320 may determine the radius of interference 215 of the user device 104. In some embodiments, the RoI 215 of the user device 104 may be calculated using the transmission power of the user device 104. In some embodiments, the RoI 215 of the user device 104 may be calculated using other information associated with the user device 104.

At block 420, the interference engine 320 may determine the RoI 220 of the client device 106. In some embodiments, the RoI 220 of the client device 106 may be set by the interference engine 320 to be equal to the RoI 215 of the user device 104. In some embodiments, the client device 106 may calculate its own RoI 220 and may transmit the RoI 220 to the interference engine 320 of the user device 104 using one or more frames or messages.

At block 425, the interference engine 320 may calculate a value using the received and determined information. In some embodiments, the interference engine 320 may add the values (e.g., distance 210 between the client device 106 and the user device 104, RoI 215 of the user device, and RoI 220 of the client device 106) to calculate the value. In some embodiments, the interference engine 320 may calculate the value using a formula, such as multiplying the RoI 215 of the user device 104 by 2 (or using the diameter of the circle of coverage generated by the user device 104) and adding the doubled RoI 215 value with the distance 210 between the client device 106 and the user device 104. Other formulas may be used to capture having both the circle of coverage generated by the user device 104 and the circle of coverage generated by the client device 106 within the circle of coverage of the access point 102, such as depicted in FIG. 1.

At block 430, the interference engine 320 may determine whether the calculated value from block 425 is greater than the RoRDA value 205. If the interference engine 320 determines that the calculated value is less than the RoRDA value 205, then the method 400 may terminate. If the interference engine 320 determines that the calculated value is greater than the RoRDA value 205, then the method may proceed along the YES branch to block 435, where the interference engine 320 may adjust the transmission power of the user device 104 and/or client device 106 (further discussed in FIG. 5).

Figure 5:
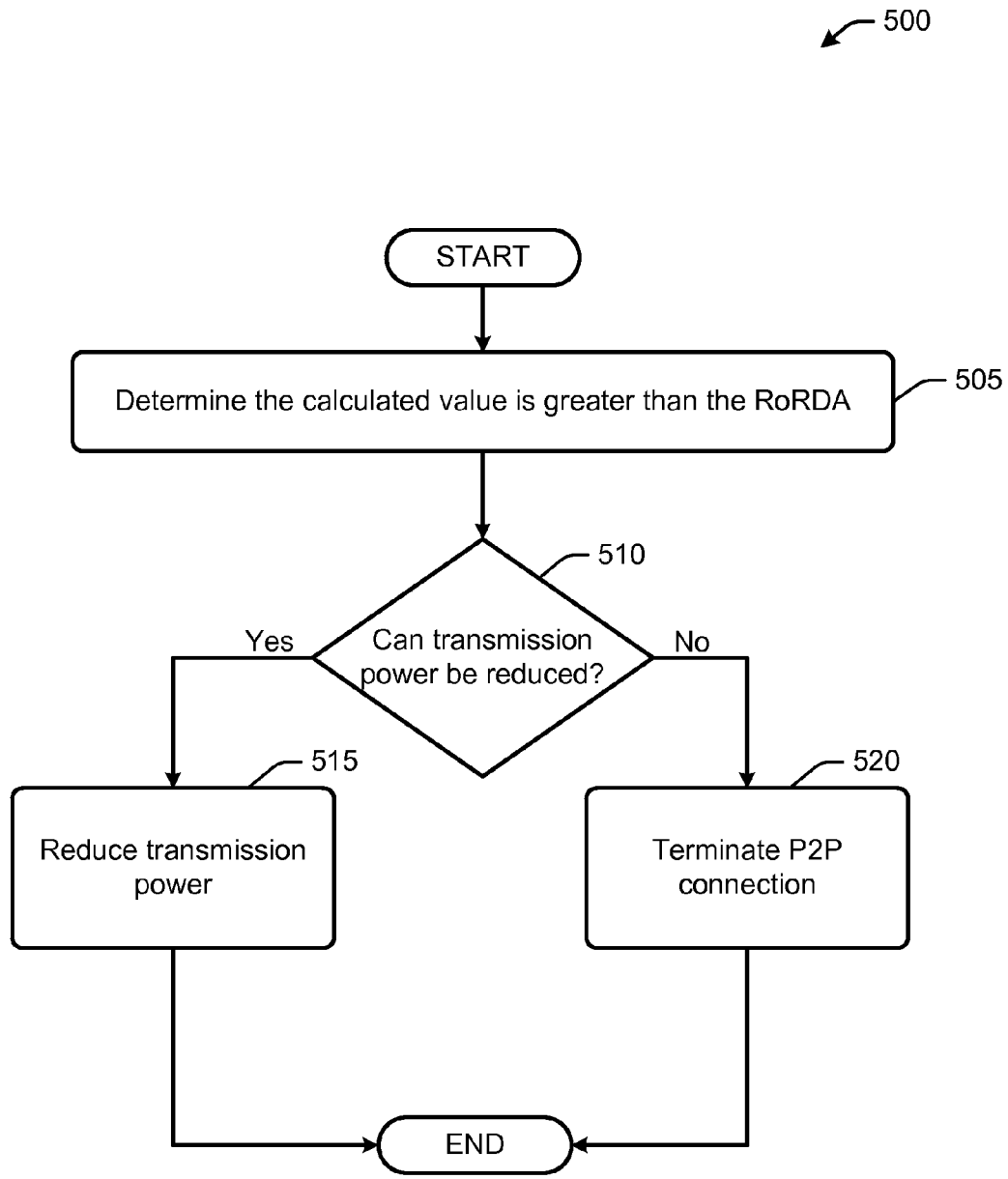
FIG. 5 is a process flow diagram of an illustrative method for adjustment actions for adaptive device transmission power for interference reduction in accordance with one or more embodiments of the disclosure.

FIG. 5 is a process flow diagram of an illustrative method 500 for adjustment actions for adaptive device transmission power for interference reduction in accordance with one or more embodiments of the disclosure. At block 505, the interference engine 320 may determine that the calculated value is greater than the RoRDA value 205. In some embodiments, the interference engine 320 may compare the calculated value to the RoRDA value 205 to determine whether the calculated value is greater than or equal to the RoRDA value 205.

At block 510, the interference engine 320 may determine whether the transmission power of the user device 104 can be reduced. In some embodiments, the interference engine 320 may determine whether the transmission power can be reduced by retrieving a minimum voltage threshold indicative of the minimum voltage necessary for the user device 104 to function. If the interference engine 320 determines that reducing the transmission power is possible, then the method 500 may proceed to block 515, where the transmission power of the user device 104 may be reduced. Additionally, the interference engine 320 may reduce or facilitate reduction of the transmission power of the client device 106. In some embodiments, the transmission power (e.g., user device 104, client device 106) may be reduced by a predetermined value. In some embodiments, the interference engine 320 may calculate a value that would decrease the calculated value in block 505 to be lower or less than the RoRDA value 205. Upon reduction of the transmission power, the method may terminate.

If at block 510, the interference engine 320 determined that the transmission power of the user device 104 could not be reduced, then at block 520, the interference engine 320 may terminate or facilitate termination of the peer-to-peer connection of the user device 104 to the client device 106.

In some embodiments, the user device 106 may verify the compatibility of the various measurements (e.g., RoRDA value, RoI 215, RoI 220) periodically to ensure all measurements are accurate and to prevent any regulatory violations as a result of changed conditions. Additionally, in some embodiments, security may be enhanced by requiring an active WiFi connection between the access point 102 and the user device 104 to ensure all data exchange between the devices can be protected through protocol security measures (e.g., 802.11 security mechanisms).

In some embodiments, client devices 106 may be prevented from generating their own circle of coverage or establishing peer-to-peer connections to other client devices. For example, the RoRDA of the user device 104 (which would be acting as an access point to the client device 104) may be set to zero. However, if the client device 106 is permitted to establish its own circle of coverage and acquire its own client devices, the RoRDA value of the user device 104 may be calculated as the RoRDA value 205 of the access point 102 minus the distance 210 between the access point 102 and the user device 104. The RoRDA value of the user device 104 may be calculated by the interference engine 320 and transmitted to the client device 106.

In one embodiment, a computer-readable medium may store computer-executable instructions which, when executed by a processor, may cause the processor to perform operations including establishing a peer-to-peer connection with a second user device; receiving, from an access point, a frame comprising a radius of radar detection area (RoRDA) value associated with the access point; determining a distance between the first user device and the access point; determining a first radius of interference area (RoI) of the first user device; determining a second RoI of the second user device; determining a first value using the distance between the first user device and the access point, the first RoI, and the second RoI; determining the first value is greater than the RoRDA value; reducing a first transmission power of the first user device; and facilitating a reduction of a second transmission power of the second user device.

In one aspect of an embodiment, determining the distance between the first user device and the access point may further comprises determining the distance between the first user device and the access point using a time of flight calculation. In one aspect of an embodiment, determining the distance between the first user device and the access point may further comprise determining the distance between the first user device and the access point using an RSSI value associated with the access point. In one aspect of an embodiment, the operations may further comprise determining the first transmission power or the second transmission power cannot be reduced; and terminating the peer-to-peer connection with the second user device. In one aspect of an embodiment, the operations may further comprise determining the peer-to-peer connection with the second user device is not active; and terminating the peer-to-peer connection with the second user device. In one aspect of an embodiment, the RoRDA value may be a first RoRDA value and wherein the operations may further comprise determining, a second RoRDA value, wherein the second RoRDA value is the first RoRDA value minus the distance between the first user device and the access point; and transmitting the second RoRDA value to the second user device. In one aspect of an embodiment, determining the second RoI may further comprise setting the second RoI to be equal to the first RoI.

In one embodiment, a system may comprise at least one antenna; at least one transceiver; at least one memory storing computer-executable instructions; and at least one processor, wherein the at least one processor may be configured to access the at least one memory and to execute the computer-executable instructions to establish a peer-to-peer connection with a second user device; receive, from an access point, a frame comprising a radius of radar detection area (RoRDA) value associated with the access point; determine a distance between the first user device and the access point; determine a first radius of interference area (RoI) of the first user device; determine a second RoI of the second user device; determine a first value using the distance between the first user device and the access point, the first RoI, and the second RoI; determine the first value is greater than the RoRDA value; reduce a first transmission power of the first user device; and facilitate a reduction of a second transmission power of the second user device.

In one aspect of an embodiment, to determine the distance between the first user device and the access point, the at least one processor may be configured to access the at least one memory and to further execute the computer-executable instructions to determine the distance between the first user device and the access point using a time of flight calculation. In one aspect of an embodiment, to determine the distance between the first user device and the access point, the at least one processor may be configured to access the at least one memory and to further execute the computer-executable instructions to determine the distance between the first user device and the access point using an RSSI value associated with the access point. In one aspect of an embodiment, the at least one processor may be configured to access the at least one memory and to further execute the computer-executable instructions to determine the first transmission power or the second transmission power cannot be reduced; and terminate the peer-to-peer connection with the second user device. In one aspect of an embodiment, the at least one processor may be configured to access the at least one memory and to further execute the computer-executable instructions to determine the peer-to-peer connection with the second user device is not active; and terminate the peer-to-peer connection with the second user device. In one aspect of an embodiment, the RoRDA value may be a first RoRDA value and wherein the at least one processor may be configured to access the at least one memory and to further execute the computer-executable instructions to determine a second RoRDA value, wherein the second RoRDA value is the first RoRDA value minus the distance between the first user device and the access point; and transmit the second RoRDA value to the second user device. In one aspect of an embodiment, to determine the second RoI, the at least one processor may be configured to access the at least one memory and to further execute the computer-executable instructions to set the second RoI to be equal to the first RoI.

In one embodiment, a method may include establishing, by a first user device comprising one or more processors, a peer-to-peer connection with a second user device; receiving, by the first user device, from an access point, a frame comprising a radius of radar detection area (RoRDA) value associated with the access point; determining, by the first user device, a distance between the first user device and the access point; determining, by the first user device, a first radius of interference area (RoI) of the first user device; determining, by the first user device, a second RoI of the second user device; determining, by the first user device, a first value using the distance between the first user device and the access point, the first RoI, and the second RoI; determining, by the first user device, the first value is greater than the RoRDA value; reducing, by the first user device, a first transmission power of the first user device; and facilitating, by the first user device, a reduction of a second transmission power of the second user device.

In one aspect of an embodiment, determining the distance between the first user device and the access point may further comprise determining, by the first user device, the distance between the first user device and the access point using a time of flight calculation. In one aspect of an embodiment, determining the distance between the first user device and the access point may further comprises determining, by the first user device, the distance between the first user device and the access point using an RSSI value associated with the access point. In one aspect of an embodiment, the method may further comprise determining, by the first user device, the first transmission power or the second transmission power cannot be reduced; and terminating, by the first user device, the peer-to-peer connection with the second user device. In one aspect of an embodiment, the method may further comprise determining, by the first user device, the peer-to-peer connection with the second user device is not active; and terminating, by the first user device, the peer-to-peer connection with the second user device. In one aspect of an embodiment, the RoRDA value may be a first RoRDA value and wherein the method may further comprise determining, by the first user device, a second RoRDA value, wherein the second RoRDA value is the first RoRDA value minus the distance between the first user device and the access point; and transmitting, by the first user device, the second RoRDA value to the second user device. In one aspect of an embodiment, determining the second RoI may further comprise setting, by the first user device, the second RoI to be equal to the first RoI.

In one embodiment, a system may comprise a means for establishing a peer-to-peer connection with a second user device; a means for receiving, from an access point, a frame comprising a radius of radar detection area (RoRDA) value associated with the access point; a means for determining a distance between the first user device and the access point; a means for determining a first radius of interference area (RoI) of the first user device; a means for determining a second RoI of the second user device; a means for determining a first value using the distance between the first user device and the access point, the first RoI, and the second RoI; a means for determining the first value is greater than the RoRDA value; a means for reducing a first transmission power of the first user device; and a means for facilitating a reduction of a second transmission power of the second user device.

In one aspect of an embodiment, the means for determining the distance between the first user device and the access point may further comprises a means for determining the distance between the first user device and the access point using a time of flight calculation. In one aspect of an embodiment, the means for determining the distance between the first user device and the access point may further comprise a means for determining the distance between the first user device and the access point using an RSSI value associated with the access point. In one aspect of an embodiment, the system may further comprise a means for determining the first transmission power or the second transmission power cannot be reduced; and a means for terminating the peer-to-peer connection with the second user device. In one aspect of an embodiment, the system may further comprise a means for determining the peer-to-peer connection with the second user device is not active; and a means for terminating the peer-to-peer connection with the second user device. In one aspect of an embodiment, the RoRDA value may be a first RoRDA value and wherein the system may further comprise a means for determining, a second RoRDA value, wherein the second RoRDA value is the first RoRDA value minus the distance between the first user device and the access point; and a means for transmitting the second RoRDA value to the second user device. In one aspect of an embodiment, the means for determining the second RoI may further comprise a means for setting the second RoI to be equal to the first RoI.

In one embodiment, an apparatus may comprise at least one antenna; at least one transceiver; at least one memory storing computer-executable instructions; and at least one processor, wherein the at least one processor is configured to access the at least one memory and to execute the computer-executable instructions to establish a peer-to-peer connection with a second user device; receive, from an access point, a frame comprising a radius of radar detection area (RoRDA) value associated with the access point; determine a distance between the first user device and the access point; determine a first radius of interference area (RoI) of the first user device; determine a second RoI of the second user device; determine a first value using the distance between the first user device and the access point, the first RoI, and the second RoI; determine the first value is greater than the RoRDA value; reduce a first transmission power of the first user device; and facilitate a reduction of a second transmission power of the second user device.

In one aspect of an embodiment, to determine the distance between the first user device and the access point, the at least one processor may be configured to access the at least one memory and to further execute the computer-executable instructions to determine the distance between the first user device and the access point using a time of flight calculation. In one aspect of an embodiment, to determine the distance between the first user device and the access point, the at least one processor may be configured to access the at least one memory and to further execute the computer-executable instructions to determine the distance between the first user device and the access point using an RSSI value associated with the access point. In one aspect of an embodiment, the at least one processor may be configured to access the at least one memory and to further execute the computer-executable instructions to determine the first transmission power or the second transmission power cannot be reduced; and terminate the peer-to-peer connection with the second user device. In one aspect of an embodiment, the at least one processor may be configured to access the at least one memory and to further execute the computer-executable instructions to determine the peer-to-peer connection with the second user device is not active; and terminate the peer-to-peer connection with the second user device. In one aspect of an embodiment, the RoRDA value may be a first RoRDA value and wherein the at least one processor may be configured to access the at least one memory and to further execute the computer-executable instructions to determine a second RoRDA value, wherein the second RoRDA value is the first RoRDA value minus the distance between the first user device and the access point; and transmit the second RoRDA value to the second user device. In one aspect of an embodiment, to determine the second RoI, the at least one processor may be configured to access the at least one memory and to further execute the computer-executable instructions to set the second RoI to be equal to the first RoI.

CONCLUSION

It should be appreciated that the program modules, applications, computer-executable instructions, code, or the like depicted in this disclosure as being stored in data storage are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on a device (e.g., user device 104), and/or hosted on other computing device(s) accessible via one or more networks, may be provided to support functionality provided by the program modules, applications, or computer-executable code depicted herein and/or additional or alternate functionality. Further, functionality may be modularized differently such that processing described as being supported collectively by the collection of program modules described herein may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules described herein may be implemented, at least partially, in hardware and/or firmware across any number of devices.

It should further be appreciated that a device (e.g., user device 104) may include alternate and/or additional hardware, software, or firmware components beyond those described or depicted without departing from the scope of the disclosure. More particularly, it should be appreciated that software, firmware, or hardware components depicted as forming part of the device (e.g., user device 104) are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 400-500 may have been described above as being performed by one or more components of a device, or more specifically, by one or more one or more program modules executing on such a device. It should be appreciated, however, that any of the operations of methods 400-500 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of any of the method 400-500 may be described in the context of the illustrative user device 105, it should be appreciated that such operations may be implemented in connection with numerous other system configurations.

The operations described and depicted in the illustrative methods of FIG. 4-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A non-transitory computer-readable medium storing computer-executable instructions which, when executed by a processor, cause the processor to perform operations comprising:
    establishing a peer-to-peer connection with a second user device;
    receiving, from an access point, a frame comprising a radius of radar detection area (RoRDA) value associated with the access point;
    determining a distance between a first user device and the access point;
    determining a first radius of interference area (RoI) of the first user device;
    determining a second RoI of the second user device;
    determining a first value using the distance between the first user device and the access point, the first RoI, and the second RoI;
    determining the first value is greater than the RoRDA value;
    reducing a first transmission power of the first user device; and
    facilitating a reduction of a second transmission power of the second user device.

2. The non-transitory computer-readable medium of claim 1, wherein determining the distance between the first user device and the access point further comprises:
    determining the distance between the first user device and the access point using a time of flight calculation.

3. The non-transitory computer-readable medium of claim 1, wherein determining the distance between the first user device and the access point further comprises:
    determining the distance between the first user device and the access point using an RSSI value associated with the access point.

4. The non-transitory computer-readable medium of claim 1, wherein the operations further comprise:
    determining the first transmission power or the second transmission power cannot be reduced; and
    terminating the peer-to-peer connection with the second user device.

5. The non-transitory computer-readable medium of claim 1, wherein the operations further comprise:
    determining the peer-to-peer connection with the second user device is not active; and terminating the peer-to-peer connection with the second user device.

6. The non-transitory computer-readable medium of claim 1, wherein the RoRDA value is a first RoRDA value and wherein the operations further comprise:
   determining, a second RoRDA value, wherein the second RoRDA value is the first RoRDA value minus the distance between the first user device and the access point; and
   transmitting the second RoRDA value to the second user device.

7. The non-transitory computer-readable medium of claim 1, wherein determining the second RoI further comprises:
   setting the second RoI to be equal to the first RoI.

8. A system comprising:
   at least one antenna;
   at least one transceiver;
   at least one memory storing computer-executable instructions; and
   at least one processor, wherein the at least one processor is configured to access the at least one memory and to execute the computer-executable instructions to:
      establish a peer-to-peer connection with a second user device;
      receive, from an access point, a frame comprising a radius of radar detection area (RoRDA) value associated with the access point;
      determine a distance between a first user device and the access point;
      determine a first radius of interference area (RoI) of the first user device;
      determine a second RoI of the second user device;
      determine a first value using the distance between the first user device and the access point, the first RoI, and the second RoI;
      determine the first value is greater than the RoRDA value;
      reduce a first transmission power of the first user device; and
      facilitate a reduction of a second transmission power of the second user device.

9. The system of claim 7, wherein, to determine the distance between the first user device and the access point, the at least one processor is configured to access the at least one memory and to further execute the computer-executable instructions to:
   determine the distance between the first user device and the access point using a time of flight calculation.

10. The system of claim 7, wherein, to determine the distance between the first user device and the access point, the at least one processor is configured to access the at least one memory and to further execute the computer-executable instructions to:
   determine the distance between the first user device and the access point using an RSSI value associated with the access point.

11. The system of claim 7, wherein the at least one processor is configured to access the at least one memory and to further execute the computer-executable instructions to:
   determine the first transmission power or the second transmission power cannot be reduced; and
   terminate the peer-to-peer connection with the second user device.

12. The system of claim 7, wherein the at least one processor is configured to access the at least one memory and to further execute the computer-executable instructions to:
   determine the peer-to-peer connection with the second user device is not active; and
   terminate the peer-to-peer connection with the second user device.

13. The system of claim 7, wherein the RoRDA value is a first RoRDA value and wherein the at least one processor is configured to access the at least one memory and to further execute the computer-executable instructions to:
   determine a second RoRDA value, wherein the second RoRDA value is the first RoRDA value minus the distance between the first user device and the access point; and
   transmit the second RoRDA value to the second user device.

14. The system of claim 7, wherein, to determine the second RoI, the at least one processor is configured to access the at least one memory and to further execute the computer-executable instructions to:
   set the second RoI to be equal to the first RoI.

15. A method comprising:
   establishing, by a first user device comprising one or more processors, a peer-to-peer connection with a second user device;
   receiving, by the first user device, from an access point, a frame comprising a radius of radar detection area (RoRDA) value associated with the access point;
   determining, by the first user device, a distance between the first user device and the access point;
   determining, by the first user device, a first radius of interference area (RoI) of the first user device;
   determining, by the first user device, a second RoI of the second user device;
   determining, by the first user device, a first value using the distance between the first user device and the access point, the first RoI, and the second RoI;
   determining, by the first user device, the first value is greater than the RoRDA value;
   reducing, by the first user device, a first transmission power of the first user device; and
   facilitating, by the first user device, a reduction of a second transmission power of the second user device.

16. The method of claim 15, wherein determining the distance between the first user device and the access point further comprises:
   determining, by the first user device, the distance between the first user device and the access point using a time of flight calculation.

17. The method of claim 15, wherein determining the distance between the first user device and the access point further comprises:
   determining, by the first user device, the distance between the first user device and the access point using an RSSI value associated with the access point.

18. The method of claim 15, further comprising:
   determining, by the first user device, the first transmission power or the second transmission power cannot be reduced; and
   terminating, by the first user device, the peer-to-peer connection with the second user device.

19. The method of claim 15, further comprising:
   determining, by the first user device, the peer-to-peer connection with the second user device is not active; and terminating, by the first user device, the peer-to-peer connection with the second user device.

20. The method of claim 15, wherein the RoRDA value is a first RoRDA value and wherein the method further comprises:
determining, by the first user device, a second RoRDA value, wherein the second RoRDA value is the first RoRDA value minus the distance between the first user device and the access point; and
transmitting, by the first user device, the second RoRDA value to the second user device.

21. The method of claim 15, wherein determining the second RoI further comprises:
setting, by the first user device, the second RoI to be equal to the first RoI.

* * * * *